United States Patent [19]

Burn

[11] Patent Number: 4,640,905
[45] Date of Patent: Feb. 3, 1987

[54] DIELECTRIC COMPOSITIONS

[75] Inventor: Ian Burn, Hockessin, Del.

[73] Assignee: E. I. Du Pont de Nemours and Company, Wilmington, Del.

[21] Appl. No.: 816,844

[22] Filed: Jan. 7, 1986

Related U.S. Application Data

[63] Continuation-in-part of Ser. No. 729,479, May 1, 1985.

[51] Int. Cl.$^4$ ............................................. C04B 35/46
[52] U.S. Cl. .................................... 501/137; 501/134; 501/135; 501/136; 361/321
[58] Field of Search ............................... 501/134–139; 361/321

[56] References Cited

U.S. PATENT DOCUMENTS

| | | | |
|---|---|---|---|
| 2,626,220 | 1/1953 | Thurnauer et al. | 106/39 |
| 2,908,579 | 10/1959 | Nelson et al. | 106/39 |
| 3,619,220 | 11/1971 | Maher | 264/61 X |
| 3,638,084 | 1/1972 | Burn | 317/258 |
| 3,682,766 | 8/1972 | Maher | 161/196 |
| 3,717,487 | 2/1973 | Hurley et al. | 106/48 |
| 3,811,937 | 5/1974 | Maher | 117/217 |
| 3,830,742 | 8/1974 | Nishida et al. | 252/62.9 |
| 4,048,546 | 9/1977 | Bouchard et al. | 361/321 |
| 4,063,341 | 12/1977 | Bouchard et al. | 29/25.42 |
| 4,228,482 | 10/1980 | Bouchard et al. | 361/321 |
| 4,379,854 | 4/1983 | Soong | 501/139 |
| 4,582,814 | 4/1986 | Thomas | 501/136 |

OTHER PUBLICATIONS

I. Burn, *J. Mat. Science*, "Flex–Sintered BaTiO$_3$ Dielectrics" pp. 1398–1408 17(1982).
V. A. Bokov and I. E. Mylinikova, *Soviet Physics–Solid State*, "Ferroelectric Prop. of Monocrystals of New Perovskite Comp.", pp. 2428–2432, 2(1961).

*Primary Examiner*—William R. Dixon, Jr.
*Assistant Examiner*—A. Knab

[57] ABSTRACT

The invention is directed to barium titanate-based densified dielectric bodies corresponding to the formula $$(1\text{-}X)[(Ba_{1-x}Pb_x)(Ti_{1-(u+v)}Zr_uSn_v)O_3] + X[A(Zn_{\frac{1}{3}}Nb_{\frac{2}{3}})O_3] + Y[F],$$

wherein A is selected from Pb, Ba and mixtures thereof.

| | | |
|---|---|---|
| X = 2.5 | to | 11.5% by weight, |
| Y = 1.0 | to | 5.0% by weight, |
| u = 0 | to | 0.125, |
| v = 0 | to | 0.125, |
| x = 0 | to | 0.125, |
| u + v = 0.015 | to | 0.125, |

F is a manganese-doped zinc borate flux.

5 Claims, No Drawings

DIELECTRIC COMPOSITIONS

CROSS-REFERENCE

This is a continuation-in-part of copending application Ser. No. 729,479 filed May 1, 1985.

FIELD OF INVENTION

The invention relates to dielectric compositions and particularly to low-firing temperature dielectric compositions.

BACKGROUND OF THE INVENTION

Because of their high volumetric efficiency and thus their small size, multilayer ceramic capacitors (MLC's) are the most widely used form of ceramic capacitors. These capacitors are fabricated by stacking and cofiring thin sheets of ceramic dielectric on which an appropriate electrode pattern is printed. Each patterned layer is offset from the adjoining layers in such manner that the electrode layers are exposed alternately at each end of the assemblage. The exposed edges of the electrode pattern are coated with a conductive material which electrically connects all the layers of the structure, thus forming a group of parallel connected capacitors within the laminated structure. Capacitors of this type are frequently referred to as monolithic capacitors.

The thin sheets of ceramic dielectric used for the fabrication of MLC's are comprised of a layer of finely divided dielectric particles which are bound together by an organic polymeric material. The unfired ceramic can be prepared by slip casting a slurry of the dielectric particles dispersed in a solution of polymer, plasticizer and solvent onto a carrier such as polypropylene, Mylar ® polyester film or stainless steel and then adjusting the thickness of the cast film by passing the cast slurry under a doctor blade to form a thin "green tape".

Metallizations useful in producing conductors for multilayer capacitors normally comprise finely divided metal particles applied to green tape in the form of a dispersion of such particles in an inert liquid vehicle. Although the above-described "green tape" process is more widely used, there are nevertheless other procedures with which dielectric compositions of the invention can be used to make MLC's. One technique is the so-called "wet process". In one aspect, this may involve passing a flat substrate through a falling sheet of dielectric slip one or more times to build up a dielectric layer (see Hurley et al., U.S. Pat. No. 3,717,487).

Another method of making MLC's involves forming a paste of the dielectric material and then alternately screen printing the dielectric and metal layers with intervening drying steps until the designed structure is complete. A second electrode layer is then printed atop the dielectric layer(s) and the entire assemblage is cofired.

Monolithic multilayer capacitors are typically manufactured by cofiring barium titanate based formulations and conductive electrode materials in oxidizing atmospheres at temperatures of 1200°-1400° C. This process yields durable, well sintered capacitors with high dielectric constant, e.g., greater than 1000. However, firing under these conditions requires an electrode material with high melting point, good oxidation resistance at elevated temperatures, sinterability at the maturing temperature of the dielectric, and minimal tendency to interact with the dielectric at the sintering temperature. These requirements normally limit the choice of electrode materials to the noble metals platinum and palladium, or to alloys of platinum, palladium and gold. See also U.S. Pat. No. 3,872,360 to J. L. Sheard which is directed to the preparation of monolithic multilayer capacitors.

Several attempts have been made to reduce the maturing temperature of dielectrics by the use of "sintering aids". Additions of bismuth oxide or bentonite to barium titanate lowers the maturing temperature to about 1200° C. (Nelson et al. U.S. Pat. No. 2,908,579). Maturing temperatures of 1200°-1290° C. may be attained by addition of phosphates to titanates as described in Thurnauer et al. U.S. Pat. No. 2,626,220. However, in each of these cases, the decrease in maturing temperature is not sufficient to permit the use of cofired silver electrodes, and dielectric properties are often degraded.

Another technique for lowering the sintering temperature of titanate-based dielectrics is by mixing high temperature ferroelectric phases (titanates, zirconates, etc.) with glasses which mature at relatively low temperatures. Examples of this approach are given in Maher U.S. Pat. No. 3,619,220, Burn U.S. Pat. No. 3,638,084, Maher U.S. Pat. No. 3,682,766, and Maher U.S. Pat. No. 3,811,937. The drawback of this technique is that the dilution effect of the glass often causes the dielectric constant of the mixture to be relatively low.

Bouchard has very successfully approached the problem of dielectric compositions having low firing temperatures and dielectric constants as high as 6000 for use in Z5U-type capacitors by the use of lead-based dielectrics instead of barium titanate. These substituted lead titanate compositions correspond to the following formula:

$(Sr_xPb_{1-x}TiO_3)_a(PbMg_rW_sO_3)_b$, wherein

| | |
|---|---|
| x = 0–0.10 | r = 0.45–0.55 |
| a = 0.35–0.5 | s = 0.55–0.45 |
| b = 0.5–0.65 | $\Sigma(r + s) = 1$, and |
| $\Sigma(a + b) = 1$. | |

Such materials are disclosed in U.S. Pat. Nos. 4,048,546, 4,063,341, and 4,228,482, all to Bouchard.

More recently, Thomas in U.S. continuing patent application Ser. No. 713,099, filed Mar. 18, 1985 and allowed Sept. 12, 1985, has improved upon the Bouchard dielectric compositions to make them more suitable for Z5U-type service. In these, the Bouchard compositions are doped with small amounts of transition metal oxides and zirconates and stannates of cadmium and zinc.

Notwithstanding the substantial progress toward attaining higher dielectric constants, the electronics industry foresees the need for dielectric compositions with low PbO contents (i.e. <10% wt.) having still higher dielectric constants (K) on the order of 8000 and even higher, which nevertheless can still be used with conventional silver-containing electrodes such as 30/70 palladium/silver electrodes.

BRIEF DESCRIPTION OF THE INVENTION

The invention is therefore directed in its primary aspect to a composition for forming a densified dielectric body at low firing temperatures comprising a mixture of finely divided particles of:

(a) $BaTiO_3$, (b) $A(Zn_{\frac{1}{3}}Nb_{\frac{2}{3}})O_3$, (c) A Curie point shifter selected from $BaZrO_3$, $PbZrO_3$, $BaSnO_3$, $PbSnO_3$ and mixtures thereof, (d) a manganese-doped zinc borate flux (F) and/or oxide precursors thereof, the proportions of (a)-(d) being substantially equivalent stoichiometrically to the formula:

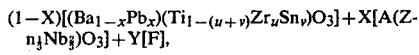
$$(1-X)[(Ba_{1-x}Pb_x)(Ti_{1-(u+v)}Zr_uSn_v)O_3] + X[A(Z-n_{\frac{1}{3}}Nb_{\frac{2}{3}})O_3] + Y[F],$$

wherein A is selected from Pb, Ba and mixtures thereof.

| | | |
|---|---|---|
| X = 2.5 | to | 11.5% by weight, |
| Y = 1.0 | to | 5.0% by weight, |
| u = 0 | to | 0.125, |
| v = 0 | to | 0.125, |
| x = 0 | to | 0.125, and |
| u + v = 0.015 | to | 0.125. |

In these compositions, the metal zinc niobate acts both as a fluxing additive and as a Curie point depressant for the $BaTiO_3$. This latter behavior is quite unexpected since lead zinc niobate, for example, has a Curie temperature of 140° C. which is higher than the Curie temperature of $BaTiO_3$.

In a secondary aspect, the invention is directed to a method for forming a monolithic capacitor comprising the sequential steps of (1) applying a layer of conductive electrode material dispersed in organic medium to each of a plurality of layers of the green tape made from the above-described composition; (2) laminating a plurality of the electrode-layered green tapes to form an assemblage of alternating layers of green tape and electrode material; and (3) firing the assemblage of step (2) at 1000°-1150° C. to remove the organic medium and organic binder therefrom and to sinter the conductive electrode material and the dielectric material.

In a third aspect, the invention is directed to a ceramic capacitor comprising a dielectric ceramic body having a dielectric constant of at least 8,000 and at least two spaced metal electrodes in contact with the ceramic body which consists essentially of the above-described composition which has been fired at 1000°-1150° C. to effect densification of the dielectric solids and sintering of the metal electrodes.

In a fourth aspect, the invention is directed to a tape casting composition comprising the above-described dielectric composition dispersed in a solution of binder polymer in a volatile nonaqueous solvent.

In a fifth aspect, the invention is directed to a method of forming green tape by casting a thin layer of the above-described dispersion onto a flexible substrate, such as a steel belt or polymeric film, and heating the cast layer to remove the volatile solvent therefrom.

In a sixth aspect, the invention is directed to screen-printable thick film compositions comprising the above-described dielectric composition dispersed in organic medium.

PRIOR ART

U.S. Pat. No. 4,266,265 to Maher is directed to a method of making ceramic capacitors in which the precursor dielectric powders are mixtures of alkaline earth metal titanates and cadmium silicates. The alkaline earth metal titanates include barium-lead-titanate and barium-lead-titanate-zirconate which can be doped with donor atoms such as Bi, Nb, Ta, Sb, W, La and U. The materials are fired at 1100° C.

U.S. Pat. No. 4,283,753 to Burn is directed to ceramic capacitors having dielectric constants of at least 5,000 which are comprised of $BaTiO_3$ doped with (a) large divalent ions selected from Ba, Pb, Sr and Ca; (b) small tetravalent ions selected from Ti, Zr, Sn and Mn; (c) donor ions capable of having greater than +4 valence selected from Bi, Nb, Sb, Ta, W and Mo; (d) charge compensating acceptor ions selected from Cd, Zn, Cu, Li and Na; and (e) glass-forming ions selected from B, Si, Ge, P and V. These materials, which are said to have dielectric constants of over 5,000, are fired at about 1100° C. to effect densification.

U.S. Pat. No. 4,335,216 to Hodgkins et al. is directed to dielectric ceramic compositions which are fired at 1000°-1150° C. in which the precursor dielectric powders are a mixture of $BaTiO_3$, $SrTiO_3$, $BaZrO_3$, $TiO_2$ and $MnO_2$ mixed with a glass frit comprising ZnO, $SiO_2$, $B_2O_3$, PbO, $Bi_2O_3$ and CdO. The compositions are used to make multilayer ceramic capacitors.

U.S. Pat. No. 4,379,854 to Soong is directed to a dielectric composition comprising finely divided particles of $BaTiO_3$, $SrZrO_3$, which function as a Curie point shifter, and ZnO and $B_2O_3$ which are flux powders. The materials are fired at 1000°-1150° C.

U.K. No. 2125028A to Nishioka et al. is directed to dielectric ceramic compositions sinterable at 1050°-1200° C. comprising (a) 100 pbw of a main component corresponding to the formula $(Ba_{1-x}Me_x)(Ti_{1-y}Me_{x'})O_3$ in which Me is Ca and/or Sr and Me' is Zr and/or Sn, and 5-15 pbw, basis (a) of a secondary component (b) which is a mixture of 65-90% $PbTiO_3$, 1-10% $Pb_5Ge_3O_{11}$ and 1-30% $BiTi_2O_7$. The materials are fired at 1050°-1360° C.

DETAILED DESCRIPTION OF THE INVENTION

A. Dielectric Materials

The $BaTiO_3$ component of the composition of the invention is commercially available in appropriate particle sizes. For the purpose of the invention, it is essential that the $BaTiO_3$, as well as the other dielectric materials, have an average particle size of no more than 2.0 $\mu m$ and preferably no more than 1.5 $\mu m$. An average particle size of 0.4-1.1 is still further preferred. On the other hand, when the average particle size of the solids is below about 0.1 $\mu m$, the particles become difficult to handle and are therefore less suitable.

The other oxide components, i.e., the metal zinc niobate, the Curie point shifter and the flux, can be readily made by admixing finely divided particles of the appropriate oxides or their precursors and firing them in air. In the case of the metal zinc niobate and the Curie point shifter, the compounds are formed by firing at 800°-1000° C. for about 5 hours which is sufficient time and temperature to get complete reaction of the component oxides, yet avoid excessive sintering and too large particle size. By the term "precursor" is meant compounds which upon firing in air are converted to metal oxides. These include hydrates, carbonates, hydroxides, nitrates, oxalates and alkoxides.

Suitable fluxes are zinc borates in which the ratio of ZnO to $B_2O_3$ is 2-4 and mixtures and precursors thereof.

In accordance with well-known glass-making practice, it will be understood that up to 50 mole % of the $B_2O_3$ can be replaced by $SiO_2$, $GeO_2$, $Al_2O_3$ or mixtures thereof.

The fluxes used in the examples were prepared by calcining a mixture of ZnO, boric acid and $MnCO_3$ at 700° C. for 18 hours and then milling.

B. Green Tape Casting Solution

As mentioned above, green tapes of the dielectric composition of the invention are made by casting a dispersion of the dielectric material in a solution of polymeric binder and volatile organic solvent onto a flexible substrate, such as a steel belt or polymeric film, and then heating the cast layer to remove the volatile solvent therefrom.

The organic medium in which the ceramic solids are dispersed consists of the polymeric binder which is dissolved in a volatile organic solvent and, optionally, other dissolved materials such as plasticizers, release agents, dispersing agents, stripping agents, antifouling agents and wetting agents.

To obtain better binding efficiency, it is preferred to use at least 5% wt. polymer binder for 95% wt. ceramic solids. However, it is further preferred to use no more than 20% wt. polymer binder in 80% wt. ceramic solids. Within these limits, it is desirable to use the least possible amount of binder vis-à-vis solids in order to reduce the amount of organics which must be removed by pyrolysis.

In the past, various polymeric materials have been employed as the binder for green tapes, e.g., poly(vinyl butyral), poly(vinyl acetate), poly(vinyl alcohol), cellulosic polymers such as methyl cellulose, ethyl cellulose, hydroxyethyl cellulose, methylhydroxyethyl cellulose, atactic polypropylene, polyethylene, silicon polymers such as poly(methyl siloxane), poly(methylphenyl siloxane), polystyrene, butadiene/styrene copolymer, polystyrene, poly(vinyl pyrollidone), polyamides, high molecular weight polyethers, copolymers of ethylene oxide and propylene oxide, polyacrylamides, and various acrylic polymers such as sodium polyacrylate, poly(lower alkyl acrylates), poly(lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid have been previously been used as binders for slip casting materials.

More recently, Usala, in U.S. divisional patent application Ser. No. 737,549 filed May 24, 1985, has disclosed an organic binder which is a mixture of compatible multipolymers of 0-100% wt. $C_{1-8}$ alkyl methacrylate, 100-0% wt. $C_{1-8}$ alkyl acrylate and 0-5% wt. ethylenically unsaturated carboxylic acid or amine. Because the polymers permit the use of minimum amounts of binder and maximum amounts of dielectric solids, their use is preferred with the dielectric composition of this invention. For this reason, the disclosure of the above-referred Usala application is incorporated by reference herein.

The solvent component of the casting solution is chosen so as to obtain complete solution of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methyl ethyl ketone, 1,1,1-trichloroethane, tetrachloroethylene, amyl acetate, 2,2,4-triethyl pentanediol-1,3-monoisobutyrate, toluene and methylene chloride.

Frequently, the organic medium will also contain a small amount, relative to the binder polymer, of a plasticizer which serves to lower the glass transition temperature (Tg) of the binder polymer. However, the use of such materials should be minimized in order to reduce the amount of organic materials which must be removed when the films cast therefrom are fired. The choice of plasticizers is, of course, determined primarily by the polymer which must be modified. Among the plasticizers which have been used in various binder systems are diethyl phthalate, dibutyl phthalate, octyl phthalate, butyl benzyl phthalate, alkyl phosphates, polyalkylene glycols, glycerol, poly(ethylene oxides), hydroxyethylated alkyl phenol, dialkyldithiophosphonate and poly(isobutylene). Of these, butyl benzyl phthalate is most frequently used in acrylic polymer systems because it can be used effectively in relatively small concentrations.

C. Thick Film Paste

Often it may be desired to apply the compositions of the invention as a thick film paste by such techniques as screen printing. When the dispersion is to be applied as a thick film paste, conventional thick film organic media can be used with appropriate rheological adjustments and the use of lower volatility solvents. In this event, the compositions must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of inert liquids can be used as organic medium. The organic medium for most thick film compositions is typically a solution of resin in a solvent and, frequently, a solvent solution containing both resin and thixotropic agent. The solvent usually boils within the range of 130°-350° C.

Especially suitable resins for this purpose are polymethacrylates of lower alcohols and monobutyl ether of ethylene glycol monoacetate.

The most widely used solvents for thick film applications are terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the desired viscosity and volatility requirements for each application.

Among the thixotropic agents which are commonly used are hydrogenated castor oil and derivatives thereof. It is, of course, not always necessary to incorporate a thixotropic agent since the solvent/resin properties coupled with the shear thinning inherent in any suspension may alone be suitable in this regard.

The ratio of organic medium to inorganic solids in the dispersions can vary considerably and depends upon the manner in which the dispersion is to be applied and the kind of organic medium used. Normally, to achieve good coverage, the dispersions will contain complementally by weight 60-90% solids and 40-10% organic medium. Such dispersions are usually of semifluid consistency and are referred to commonly as "pastes".

The pastes are conveniently prepared on a three-roll mill. The viscosity of the pastes is typically within the following ranges when measured at room temperature on Brookfield viscometers at low, moderate and high shear rates:

| Shear Rate (Sec$^{-1}$) | Viscosity (Pa.s) | |
|---|---|---|
| 0.2 | 100-5000 | — |
| | 300-2000 | Preferred |
| | 600-1500 | Most Preferred |
| 4 | 40-400 | — |
| | 100-250 | Preferred |
| | 140-200 | Most Preferred |
| 384 | 7-40 | — |
| | 10-25 | Preferred |
| | 12-18 | Most preferred |

The amount and type of organic medium (vehicle) utilized is determined mainly by the final desired formulation viscosity and print thickness.

D. Capacitor Processing

As described above, many multilayer capacitors are fabricated by printing on electrode metallization in the desired pattern upon a dielectric substrate which is a green tape. The printed dielectric substrates are stacked, laminated and cut to form the desired capacitor structures. The green dielectric material is then fired to effect removal of the organic medium from the electrode material and of the organic binder from the dielectric material. The removal of these materials is accomplished by a combination of evaporation and thermal decomposition during the firing operation. In some instances it may also be desirable to interpose a preliminary drying step prior to firing. The thickness of the unfired green tape is typically about 1.2-1.3 mils and upon firing the thickness becomes about 0.9-1.0 mil.

When firing the above-described capacitor assemblages, it is preferred to employ a first firing step in which the assemblage is heated slowly to 100°-550° C., which will be effective to remove all of the organic material without damage to the laminated assemblage. Typically the organic burnout period is 18-24 hours to assure complete removal of organics. When this has been completed, the assemblage is then heated more rapidly to the desired sintering temperature.

The desired sintering temperature is determined by the physical and chemical characteristics of the dielectric material. Ordinarily the sintering temperature will be chosen to obtain maximum densification of the dielectric material. For the dielectric compositions of this invention, the temperature will range from 1000° to 1150° C. However, it will be recognized by those skilled in the art of fabricating capacitors that maximum densification is not always needed. Therefore, the term "sintering temperature" refers to the temperature (and implicitly the amount of time as well) to obtain the desired degree of densification of the dielectric material for the particular capacitor application. Sintering times also vary with the dielectric composition but ordinarily on the order of two hours at the sintering temperature is preferred.

Upon completion of sintering, the rate of cooling to ambient temperature is carefully controlled in accordance with resistance of the components to thermal shock.

The following properties which are relevant to the ability of a given capacitor to function properly as referred to in the examples.

E. Test Procedures

Capacitance

Capacitance is a measure of the capability of a material to store an electrical charge expressed mathematically, C=KAN divided by t, where K is dielectric constant, A equals area overlap of electrodes, N is number of dielectric layers, and t is thickness of dielectric layer.

The units of capacitance are farads or fractions thereof such as microfarads ($10^{-6}$ farad), nanofarads ($10^{-9}$ farad) or picrofarads ($10^{-12}$ farad).

Dissipation Factor

Dissipation factor (DF) is a measure of the phase difference between voltage and current. In a perfect capacitor the phase difference would be 90°. However, in practical dielectric systems, this phase difference is less than 90° by an amount $\sigma$ because of leakage and relaxation losses. In particular, DF is the tangent of the angle $\sigma$.

Insulation Resistance

Insulation Resistance (IR) is a measure of the ability of a charged capacitor to withstand leakage in DC current. Insulation resistance expressed as ohm.farads ($\Omega$F) is a constant for any given dielectric regardless of capacitance.

The following examples and comparative showings are presented to illustrate the advantage of the present invention. In the examples and elsewhere in the specification and claims, all parts, percentages, proportions, etc., are by weight, unless otherwise stated.

EXAMPLES

EXAMPLE 1

Preparation of Materials

A. Barium Titanates

The barium titanates were commercial materials. Fuji HPBT-1 was used mainly but good results were obtained with an alternate material (219-6) from the Transelco Division of Ferro Corporation. Typical particle size distributions as determined with a Leeds and Northrup particle size analyzer (Microtrac) are given below:

| | $D_{10}$ | $D_{50}$ | $D_{90}$ | (micrometers) |
|---|---|---|---|---|
| Fuji HPBT-1 | 0.31 | 0.53 | 0.93 | |
| Transelco 219-6 | 0.42 | 0.94 | 2.35 | |

B. Lead Zinc Niobate

The lead zinc niobate was prepared by first ballmilling 65.9% PbO, 26.1% $Nb_2O_5$ and 8.0% ZnO (parts by weight) in isopropanol or other liquid for 5 hours with $ZrO_3$ media. When dried, the mixed powders were calcined at 800° C. for 5 hours, and then ballmilled 16 hours to give a typical particle size ($D_{50}$) of 0.9 micrometer.

C. PbZrO3 or PbSnO3

These additives were prepared by milling and calcining stoichiometric amounts of PbO with ZrO2 or SnO2 under the same conditions as those used for the lead zinc niobate. Particle sizes ($D_{50}$) were typically 0.7 to 1.0 micrometer.

D. BaZrO3 or BaSnO3

These were commercial powders. The BaSnO3 (Transelco) was used as received, whereas the BaZrO3 was premilled. Typical particle sizes were 0.9 to 1.1 micrometer.

E. Frit/Flux

Details of the preparation of the fluxes used in the invention are given in the examples which follow.

Ceramic tape was made by casting a milled slurry consisting of 66.0 g binder solution (Du Pont 5200) to the following mixtures of powders: 80.0 BaTiO3 (Fuji HPBT-1), 12.50 PbSnO3, 3.82 Pb(Zn⅓Nb⅔)O3, 2.50 BaSnO3, and 1.50 manganese-doped zinc borate frit. The zinc borate frit consisted of 74.83% ZnO, 21.35% B2O3 and 3.82% MnCO3 and was made by calcining a mixture of ZnO, boric acid, and MnCO3 at 700° C. for 18 hours and then milling to a particle size less than 2 micrometers. The ceramic tape was cut and laminated into plates approximately 0.4×0.4×0.025". Following a bakeout step in air at 750° C. to remove the organic binder, these plates were fired in a closed alumina crucible at 1100° C. for 2½ hours. After firing, the plates were electroded with silver paste (Du Pont 6730) before measuring dielectric properties at 1 kHz and 1.0 volt. The Curie temperature was 35° C. and the dielectric constant was 8400±500 with DF=1.2%.

EXAMPLES 2, 3 AND 4

Ceramic tapes were made with the following ceramic composition (in parts by weight): 82.0 BaTiO3 (HPBT-1), 6.0 Pb(Zn⅓Nb⅔)O3, 5.5 PbZrO3 and 5.0 BaZrO3, to which varying amounts of zinc borate frit were added. The zinc borate frit was made from a mixture of 45.4 wt. % ZnO, 23.0 wt. % boric acid, 11.7 wt. % MnCO3 and 20.0 wt. % BaCO3 which was calcined 5 hours at 700° C. and then milled to a particle size of 1.25 micrometers. In these examples, BaCO3 was added with the MnCO3 to maintain cation stoichiometry relative to the BaTiO3. Multilayer ceramic capacitors were made with 1.0 mil dielectric layers and 30 Pd-70 Ag electrodes for frit levels of 1.25, 1.50 and 1.75 wt. %. These capacitors were fired as in the previous examples with the following results:

| Example | Frit Level (wt. %) | K | DF(%) | Curie Temp. (°C.) | IR (ΩF) |
|---|---|---|---|---|---|
| 2 | 1.25 | 9800 | 1.70 | 10 | 14,000 (max)* |
| 3 | 1.50 | 8300 | 1.35 | 10 | 9,500 |
| 4 | 1.75 | 8100 | 1.35 | 10 | 4,000 |

*IR was variable, indicating marginal densification

EXAMPLE 5

Plate capacitors were made as in Example 1 but with the following compositions: 87.0 BaTiO3 (HPB-T), 11.5 Pb(Zn⅓Nb⅔)O3 and 1.5 zinc borate frit, which was the same as that used in Example 2. When fired as in the previous examples, the Curie temperature was 35° C. and the dielectric constant at 25° C. was as high as 7600, with DF=0.8%. This composition had marginal dielectric constant for the application of this invention.

COMPOSITION SUMMARY

| Example | X (wt. %) | x (mol) | Y (wt. %) | u (mol) | v (mol) | MnO2 wt. % |
|---|---|---|---|---|---|---|
| 1 | 3.9 | 0.087 | 1.52 | — | 0.108 | 0.043 |
| 2 | 6.1 | 0.041 | 1.27 | 0.088 | — | 0.13 |
| 3 | 6.1 | 0.041 | 1.52 | 0.088 | — | 0.16 |
| 4 | 6.1 | 0.041 | 1.78 | 0.088 | — | 0.19 |
| 5 | 11.7 | — | 1.52 | — | — | 0.16 |

EXAMPLE 6

MLC capacitors were made with the same basic ceramic composition as Example 2 and by the same method except that Transelco 219-6 barium titanate was used instead of HPBT-1 and a few drops of acetic acid were added to the ceramic slip to improve dispersion. Experiments were carried out with 1.25 and 1.50% frit only. The capacitors were fired as described previously and had the following electrical results.

|  | 1.25% Frit | 1.50% Frit |
|---|---|---|
| Capacitance (microfarad) | 0.076 | 0.075 |
| DF (1 Volt) | 1.2 | 1.1 |
| K | 9000 ± 500 | 8800 ± 200 |
| Curie Temp. (°C.) | 5 | 5 |
| IR (ΩF) | 15,000 | 8,500 |

EXAMPLES 7–12

Two further compositions were made by the procedure of Example 2 and each was fired at three different temperatures to observe the effect of sintering temperature on electrical properties. The composition and properties of these materials are given in Table 1 below.

TABLE 1

| Example No | 7 | 8 | 9 | 10 | 11 | 12 |
|---|---|---|---|---|---|---|
| Composition of Materials | | | | | | |
| Fuji HPBT-1, % wt. | 83.0 | 83.0 | 83.0 | 82.5 | 82.5 | 82.5 |
| BaZrO3 | 4.0 | 4.0 | 4.0 | 4.5 | 4.5 | 4.5 |
| Lead Zinc Niobate | 6.0 | 6.0 | 6.0 | 6.0 | 6.0 | 6.0 |
| PbZrO3 | 5.5 | 5.5 | 5.5 | 5.5 | 5.5 | 5.5 |
| Frit | 1.5 | 1.5 | 1.5 | 1.5 | 1.5 | 1.5 |
| Firing Temperature, °C. | 1107 | 1093 | 1079 | 1107 | 1093 | 1079 |
| Electrical Properties | | | | | | |
| K | 10,000 | 9,200 | 9,100 | 10,300 | 9,000 | 8,700 |
| DF, % | 1.5 | 1.1 | 1.3 | 1.2 | 1.1 | 1.0 |

The dielectric constant as well as the DF value of the dielectric tended to be reduced as the sintering temperature was lowered.

EXAMPLE 13

The use of barium zinc niobate in the invention is illustrated by the example in which 200 grams of BaCO3 were ballmilled for 5 hours in isopropanol with 98.80 grams of Nb2O5 and 30.24 grams ZnO. After being dried, the mixed powder was calcined at 1000° C. for 5 hours in a high purity alumina crucible. It was then milled with ZrO2 balls to a particle size ($D_{50}$) of 0.81 micrometers.

Multilayer ceramic capacitors were made as in the previous examples with electrodes of 30% Pd-70% Ag. The ceramic composition was as follows: 82.25 wt. %

BaTiO₃ (Fuji HPBT-1), 11.0 wt. % PbZrO₃, 4.5 wt. % Ba(Zn⅓Nb⅔)O₃ and 1.25 wt. % of the Mn-doped zinc borate flux used in Example 2. When fired as in the previous examples, the Curie temperature was 25° C. and the dielectric constant was 9600 with DF=3.0%. Insulation resistance exceeded 10,000 ΩF.

I claim:

1. A composition for forming a densified dielectric body at low firing temperatures consisting essentially of a mixture of finely divided particles of:
   a. BaTiO₃,
   b. A(Zn⅓Nb⅔)O₃,
   c. A Curie point shifter selected from BaZrO₃, PbZrO₃, BaSnO₃, PbSnO₃ and mixtures thereof,
   d. a manganese-doped metal borate flux (F) selected from zinc borates in which the ratio of ZnO to B₂O₃ is 2-4 and mixtures and oxide precursors thereof, the proportions of a.-d. being substantially equivalent stoichiometrically to the formula:

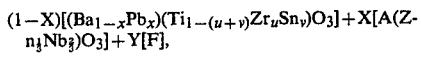

wherein A is selected from Pb, Ba and mixtures thereof

| | | |
|---|---|---|
| X = 2.5 | to | 11.5% by weight, |
| Y = 1.0 | to | 5.0% |
| u = 0 | to | 0.125, |
| v = 0 | to | 0.125, |
| x = 0 | to | 0.125, and |
| u + v = 0.015 | to | 0.125. |

2. The composition of claim 1 which contains additionally 0.05-0.5% wt. manganese oxide as MnO₂, BaMnO₃ or precursors thereof.

3. The composition of claim 1 in which c. is a mixture of PbZrO₃ and BaZrO₃, and d. is 3ZnO.B₂O₃.

4. The composition of claim 3 in which up to 50 mole % of the B₂O₃ is replaced by SiO₂, GeO₂, Al₂O₃ or mixtures thereof.

5. A dielectric composition consisting essentially of the composition of claim 1 which has been fired in air at 1000°-1150° C. to effect sintering of the particles and densification of the mixture.

* * * * *